United States Patent [19]
Butcher et al.

[11] Patent Number: 5,456,015
[45] Date of Patent: Oct. 10, 1995

[54] CONSTRUCTION FRAMING SQUARE

[75] Inventors: Richard L. Butcher, Williams; Michael P. Tedsen, Grants Pass, both of Oreg.

[73] Assignee: Applied Concepts Engineering, Grants Pass, Oreg.

[21] Appl. No.: 163,881

[22] Filed: Dec. 8, 1993

[51] Int. Cl.⁶ ............................................. B43L 7/027
[52] U.S. Cl. .......................... 33/451; 33/474; 33/476; 33/481
[58] Field of Search ............................. 33/42, 43, 44, 33/415, 416, 417, 451, 474, 476, 480, 481

[56] References Cited

U.S. PATENT DOCUMENTS

| | | | |
|---|---|---|---|
| 855,987 | 6/1907 | Schlageter | 33/474 |
| 1,139,229 | 5/1915 | Requa | 33/476 |
| 2,470,035 | 5/1949 | Hudkins | 33/42 |
| 2,965,969 | 12/1960 | Haley | 33/481 |
| 3,183,596 | 5/1965 | Shaw | 33/481 |
| 3,823,481 | 7/1974 | Chapin . | |
| 4,227,314 | 10/1980 | Schliep . | |
| 4,361,964 | 12/1982 | Hennessee | 33/481 |
| 4,503,624 | 3/1985 | Whiteford | 33/42 |
| 4,574,492 | 3/1986 | Miller | 33/476 |
| 4,654,978 | 4/1987 | Wolford, Jr. | 33/474 |
| 4,712,307 | 12/1987 | Kish | 33/451 |
| 4,742,619 | 5/1988 | Swanson | 33/474 |
| 4,944,096 | 7/1990 | Tolley | 33/451 |
| 4,967,482 | 11/1990 | Hoover et al. . | |
| 5,077,910 | 1/1992 | Smith . | |
| 5,090,129 | 2/1992 | Cunningham | 33/474 |
| 5,113,596 | 5/1992 | Meyers . | |
| 5,170,568 | 12/1992 | Wright | 33/474 |
| 5,239,762 | 8/1993 | Grizzell | 33/417 |
| 5,253,426 | 10/1993 | Mosbrucker | 33/451 |

FOREIGN PATENT DOCUMENTS

| | | | |
|---|---|---|---|
| 0098777 | 4/1991 | Japan | 33/474 |
| 84466 | 3/1920 | Switzerland | 33/42 |

*Primary Examiner*—Thomas B. Will

[57] ABSTRACT

A multipurpose rectangular layout Ultra-square which incorporates attributes of a triangular shaped-square, Carpenter-square and is designed for use in conjunction with a conventional tape measure. The tape measure is attached in such a way that it forms a right angle to the layout square for measuring distances for a framing layout, enabling a user to mark multiple parallel lines in a perpendicular direction at specified distances measured from the end of the tape. The square has indicia in calibrated scales for rafter, angle and linear measurements. The squares base extends elongated. A guide is attached at a right angle and perpendicular to the base. The base and guide have edges and notches for dimensional marking and indicia placement. Some of these edges are used to significantly reduce the steps required for rafter layout. The square is dimensioned to compliment the size of standard material used in construction. These dimensions enable the user to mark both top and bottom plates and the like with multiple parallel lines, to delineate exact location for placement of standard, stringer and sill (three adjacent) studs without relocating the square. Also, it very quickly locates the reference measuring point and final cut lines for all types of rafter cuts. This square may be used from either the left or right directions.

17 Claims, 4 Drawing Sheets

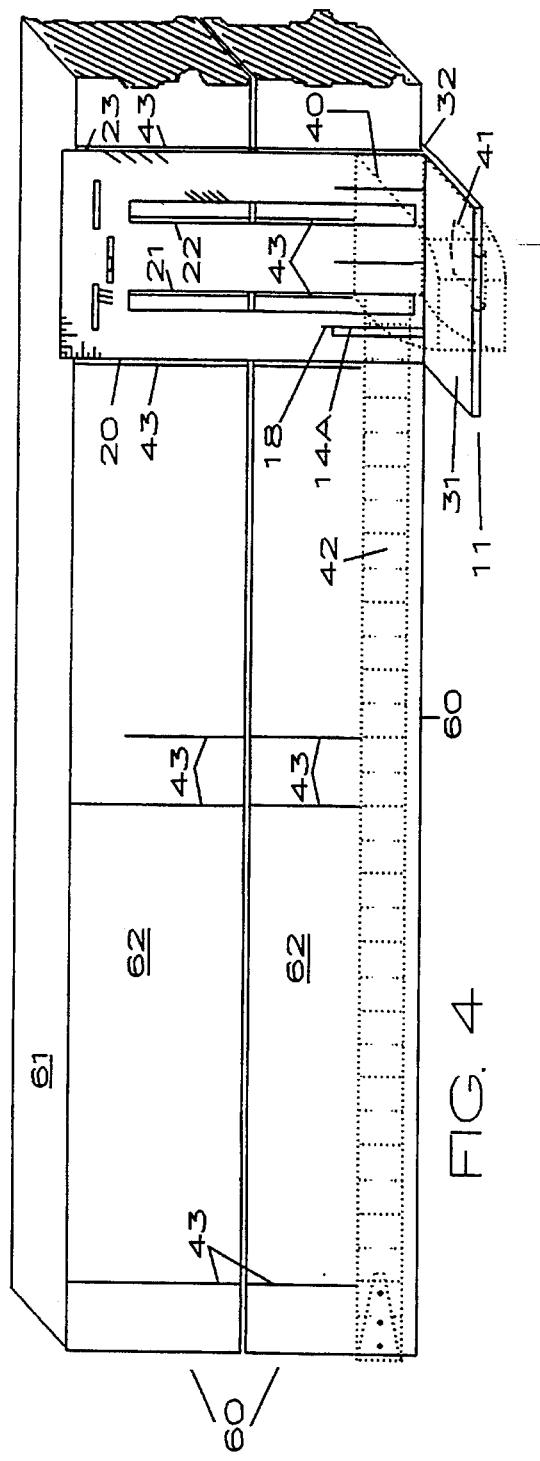
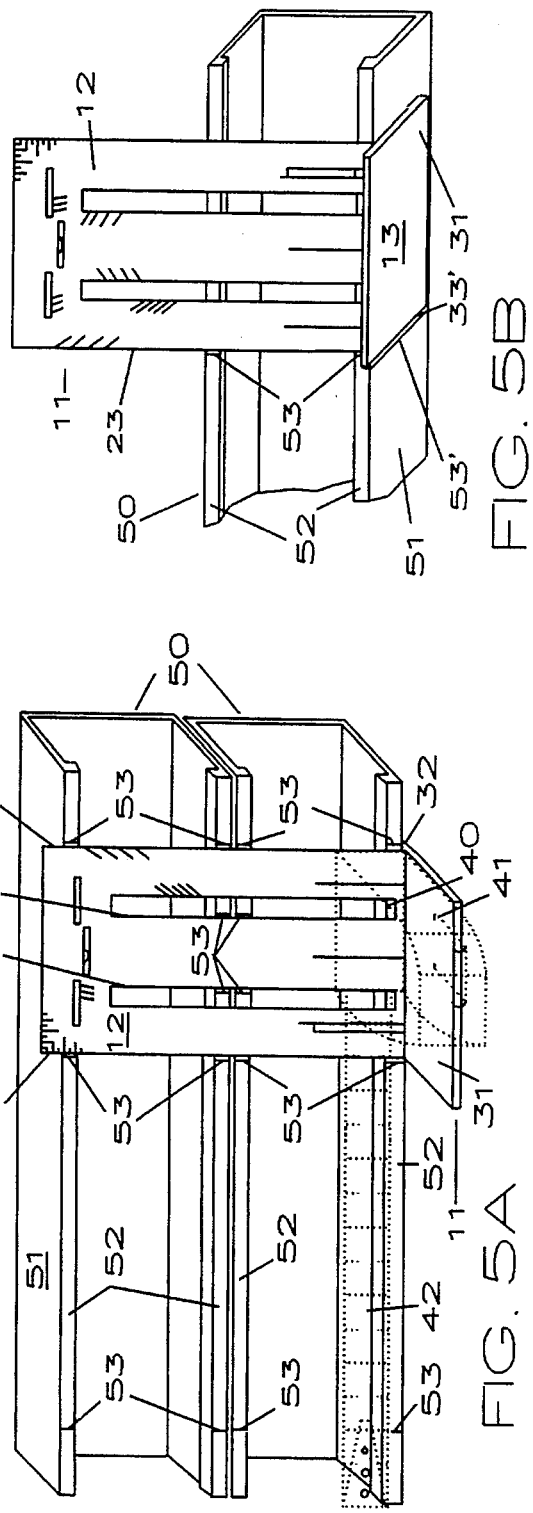

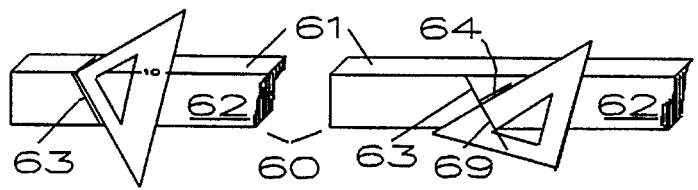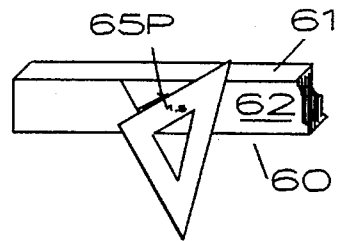
FIG. 6A　　　FIG. 6B　　　FIG. 6C
PRIOR ART　PRIOR ART　PRIOR ART
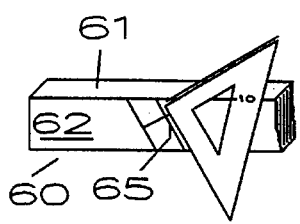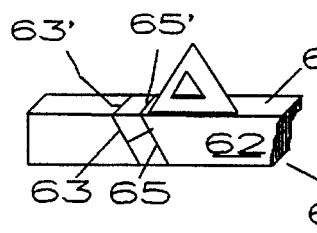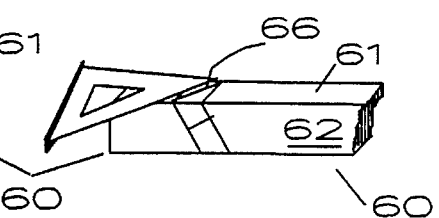
FIG. 6D　　　FIG. 6E　　　FIG. 6F
PRIOR ART　PRIOR ART　PRIOR ART
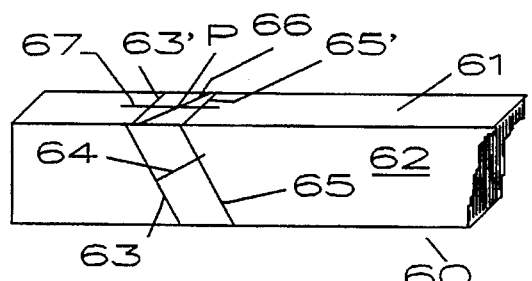
FIG. 6G
PRIOR ART
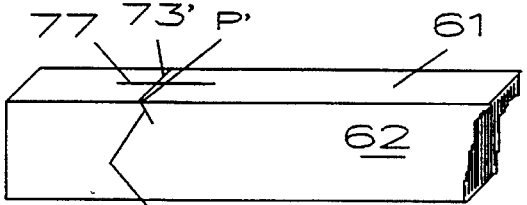
FIG. 7C
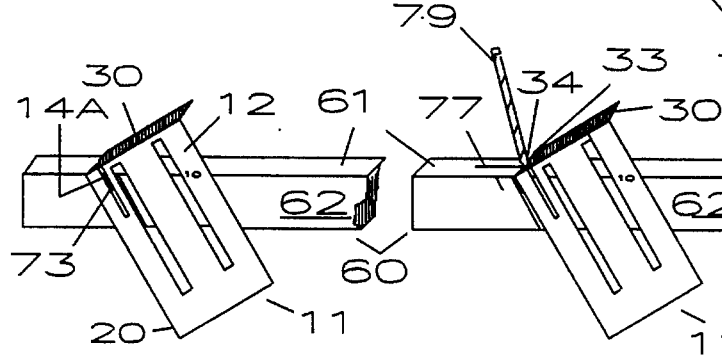
FIG. 7A　　FIG. 7B

CONSTRUCTION FRAMING SQUARE

BACKGROUND OF THE INVENTION

1: Field of Invention

This invention is related in general to framing tools, and more particularly, to layout squares for determining the reference points and lines during rafter construction and the layout of conventional stud walls, caps and the like.

2: Description of the Prior Art

Various devices have been designed in the past to measure angles and distances on construction material, and may have tape attachments and a means for marking plates, such as for studs and the like. Many of these devices are complicated and cumbersome, some requiring numerous steps to perform marking functions. The more steps there are the greater is the probability of error. Such devices are specialized and therefore require that other tools and steps be employed during standard construction framing. Examples of prior art multi-functional tools are disclosed in U.S. Pat. Nos. 4,712,307 to Kish (1987); 3,823,481 to Chapin (1974); 4,227,314 to Schliep (1980); 5,113,596 to Meyers (1992) and 5,077,910 to Smith (1992). All of the devices disclosed in these patents are limited in their functionality or are complicated to use.

In U.S. Pat. No. 4,574,492 to Miller (1986), discloses a device for laying out cuts for studs on standard construction lumber. However, it is difficult to learn to use it inasmuch as it requires the user to learn more than 14 combinations of markings. Also, an endpiece of the device is dimensioned in one direction equal to the thickness of two standard 2×4's and indicia for common rafters and hip and valley rafters are on opposing sides of the device. This requires the operator to either turn the board over or place the device on the bottom of the board to mark the opposite angles, therefore adding to complexity. Also, the aforementioned dimension of the endpiece prevents the device from being laid flat across the width of a board that is 1½" thick unless the board is put on edge or elevated off a flat surface. This device does not provide a means of attaching a conventional tape measure for the quick referencing and marking of material over extended distances. Furthermore, this device with its adapter is cumbersome, it requires assembly by the user and it does not lend itself to economic production.

In general triangular shaped-squares, as in prior art U.S. Pat. No. 5,170,568 to Wright (1992) and U.S. Pat. No. 4,742,619 to Swanson (1988), require extensive steps to determine the proper location to mark a hip or valley rafter measuring point and a final plumb cut line.

In U.S. Pat. No. 4,976,482 to Hoover (1990), discloses several tape measure attachment brackets that mount a conventional tape measure to various different squaring tools to achieve layout capability. A different bracket is required for each type of tool and the user must attach and detach the bracket when the associated tool is to be used for other functions. This may result in the loss of the bracket(s) not in use.

Therefore, there is a need for a single square that is compact, easy to use, handle and carry; provides for simplified marking and making of common, hip and valley rafter measurements; may be used in conjunction with a standard tape measure to accurately and simultaneously measure and mark top, bottom, and cap plates for multiple studs, rafters, and the like; will work left or right handed; is economical to produce; and easy to learn.

SUMMARY OF THE INVENTION

The improved device of the present invention satisfies the forgoing needs. Accordingly, it is an object of the present invention generally to overcome the difficulties and disadvantages of the prior art discussed above.

The preferred embodiment of the present invention is a layout square having a rectangular base with opposing parallel faces having a first edge and second edge disposed at a right angle. In order to complement the size of standard construction materials the length of the second edge is dimensioned to cover not less than the width of two pieces of material laid side by side and the length of the first edge is proximate the thickness of three pieces of material laid together on edge. The base is provided with subsequent edges that extend parallel to the bases second edge and their lengths are proximate the length of the base. These edges are parallel to the second edge of the base and spaced substantially equal to the thickness of a piece of material from each other. A guide is integrally connected on one end of the base along the first edge and is perpendicular to the base. The guide extends in opposite directions and is dimensioned not to exceed the thickness of the aforementioned material. A conventional tape measure may be securely attached to the guide by using the tape measure case clip, also referred to as a catch. The square and tape measure are connected in such away that the second edge forms a right angle with the tape extended. This allows the user to mark one or more parallel straight lines in a perpendicular direction at selected distances measured from the end of the tape, therefore marking the locations for one to three consecutive studs. The base edges provide locations for indicia in degrees, common rafter, hip and valley rafter, linear scales and the marking of material at specified distances. Notches are located in the square to provide centering, measurement and marking positions as well as indicia locations for accurate placement of markings and the like. Some edges and notches are used to substantially reduce the amount of steps required to determine a proper hip or valley rafter reference point and final cut line. Additionally this square may incorporate a level(s) to be used in determining existing roof pitches, plumb and level. It is seen that such a layout square can greatly reduce the error and complexity of determining precise marking locations, thus reducing the layout time required performing most construction layout tasks Various other features and advantages of the invention will become clear from the following detailed description and the associated drawings. These drawings and descriptions disclose only some of the various ways in which the invention may be practiced in standard construction and the like, and are therefore provided for the purpose of illustration and not limitation.

BRIEF DESCRIPTION OF THE DRAWINGS

FIG. 4 is a perspective view of the square of FIG. 1 illustrating the attachment of a standard tape measure as used to mark the top and bottom plates during construction of a wall.

FIGS. 5A–5B illustrate the use of the square of FIG. 1 for marking metal members.

FIGS. 6A–6G illustrate a prior art method of locating and marking the center, reference measuring point, and final cut line of a hip or valley rafter top plumb cut using a conventional triangular shaped-square.

FIGS. 7A–7C illustrate a method of locating and marking the reference measuring point and final cut line of a hip or valley top plumb cut using the square of FIG. 1.

DETAILED DESCRIPTION OF THE PREFERRED EMBODIMENT

Figure 1:
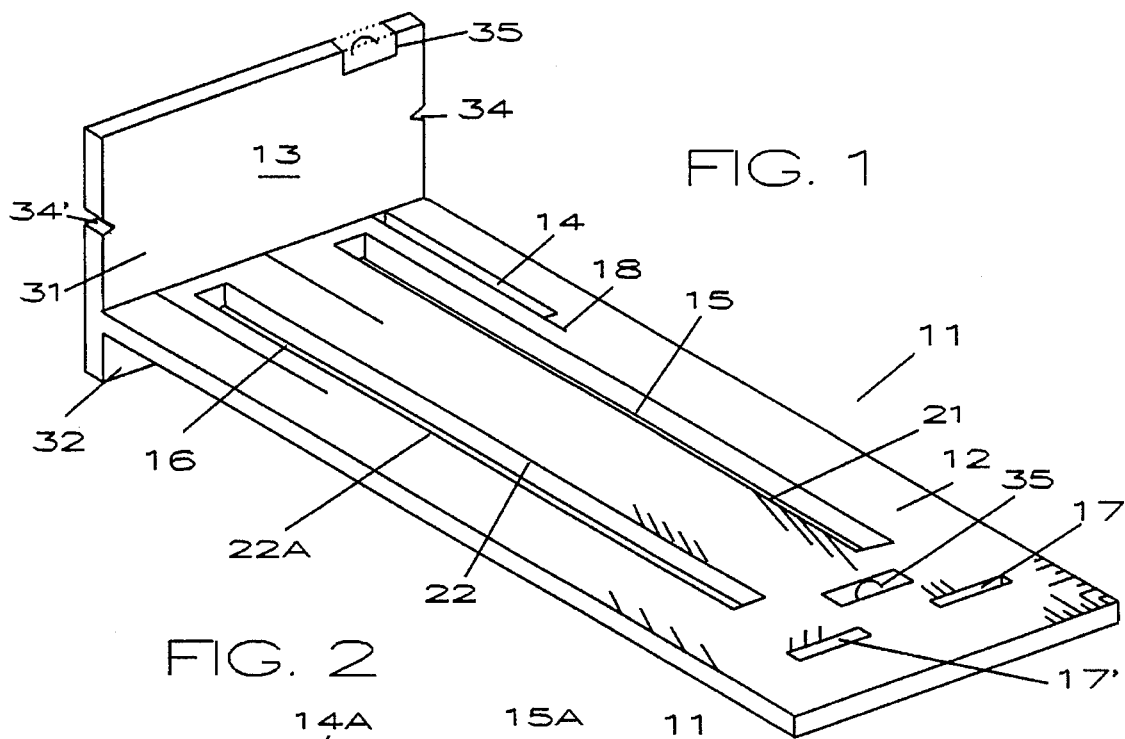
FIG. 1 is an isometric view showing a layout and angle measurement square made according to the preferred embodiment of the present invention.

Referring now in more detail to the application drawings, wherein like parts are designated throughout with like numerals, FIG. 1 shows a perspective view of a layout device and rafter angle measurement square 11 made according to the present invention.

This square is comprised primarily of an elongated, planar base 12, with two opposing faces. The base is rectangularity shaped. A planar guide with two opposing faces 13 is integrally connected to one end of base 12. The guide extends bi-directional on a plane and is perpendicular and at a right angle to the elongated base 12. Rectangular shaped cutouts 14, 15, 16, 17, and 17' are used for marking, viewing, measuring and/or indicia placement. However, the marking indicia may be of any desired type and can be used to make any desired measurements or alignments. Additionally a level(s) 35 may be attached to the base or guide as shown but is not limited to these locations.

Figure 2:
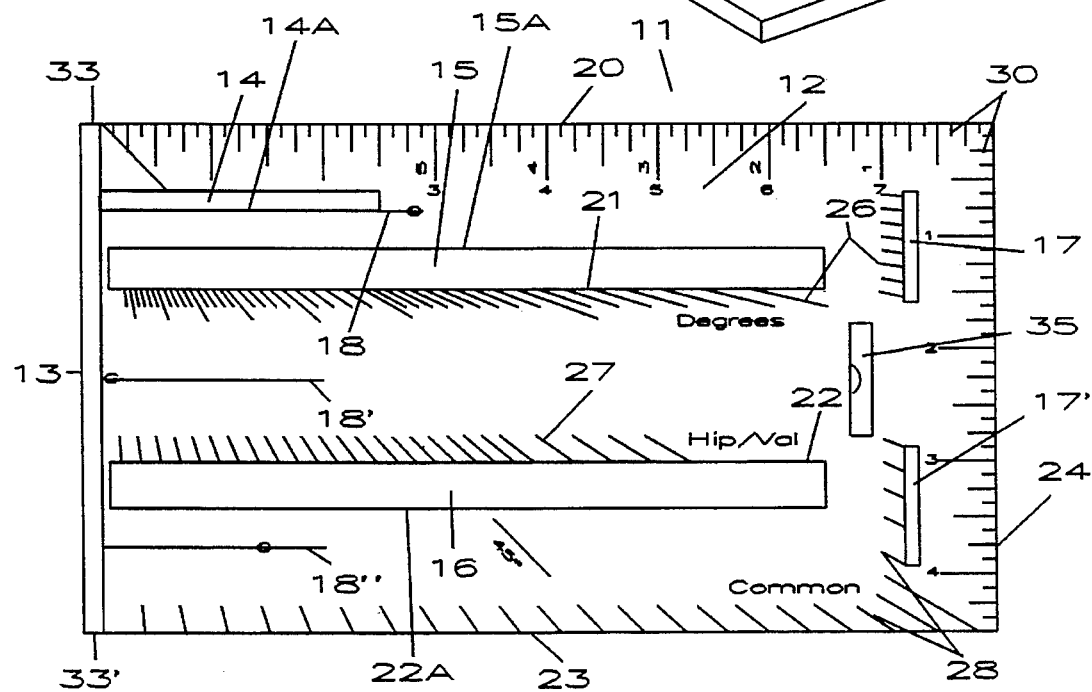
FIG. 2 is a top view of the square of FIG. 1

Referencing FIG. 2, in order to compliment the size of "standard construction materials", hereafter referred to as board(s) also, 2×4 lumber with a finished dimension of 1 and ½ inches by 3 and ½ inches is used for examples. The length of base 12 is dimensioned longitudinally to cover two or more boards laid side by side (8 inches) (ref. FIG. 4). The width of base 12 is dimensioned for the thickness of three boards laid together on edge (4 and ½ inches). The base encompasses cutouts 15, and 16 with longitudinal edges 21, and 22 parallel to base longitudinal edges 20, and 23. The length of edges 21 and 22 are proximate the length of base 12 (6 and ½ inches). The distance between edges 21 and 22 is proximate the thickness of one board (1 and ½ inches) and they are positioned so that the distance between longitudinal edges 20 to 21, 21 to 22 and 22 to 23 are substantially equal spaced. A transverse edge 24 equal to the width of base 12 is connected at its longitudinal extent opposite guide 13.

Guide 13 has two opposing edges 33 and 33'.

Cutout 14 has an edge 14A which is parallel and centered between edges 20 and 21 and extends longitudinally from the intersection of base 12 and guide 13. This cutout is of sufficient length (at least 2 inches) and width (at least 3/16 but not greater than 7/16 inches) to allow viewing and/or marking of a board at edge 14A.

Cutout 15 has an edge 15A being a distance substantially equal to 0.707 (sine of 45 degrees) times the thickness of a board from edge 20, this distance is 1.06 inches. Therefore, the distance between edges 14A and 15A is substantially 0.207 (0.707– 0.5) times a board thickness, this distance is 5/16 inch. The relationships of edges 20, 14A, and 15A are constant ratios. These edges, with these ratios, determine the reference measuring point and the final cut line for any given hip or valley type rafter of equal pitched roofs cut at a standard 45 degree angle. This significantly reduces the steps required to mark the desired lines for rafter hip and valley type cuts (as described for FIG. 7).

Cutouts 17 and 17' extend parallel to and are approximately ¾ inch from edge 24. These edges are of sufficient width to allow the viewing of the boards edge. These cutouts are used to place indicia to properly locate and/or mark common rafter pitch or angles.

Notch 18, 18', and 18" are placed extending longitudinally from the junction of base 12 and guide 13 on centers between pairs of edges 20 and 21, 21 and 22, 22 and 23 respectively. These notches provide the user the flexibility to add or subtract one half the thickness of a board relative to any of these parallel edges.

A beveled edge(s) 25, shown at cutout 14, may be provided to alleviate a potential parallax problem and enhance the reading, measuring and marking when using this square. This bevel is not limited as shown but may be added to additional edges to provide the same enhancements.

Indicia that have a calibrated scales for angles 26, a hip and valley rafter rise to run ratios (pitch) 27 and a common rafter rise to run ratios 28 are provided on or about edges 21, 22, 23, and cutouts 17, and 17'. However, the marking indicia may be of any desired type and can be used to make any desired measurements or alignments.

A linear indicia 30 with an ascending and descending inch scale is placed on edges 20 and 24 to form a small conventional carpenters-square. This carpenters-square arrangement may be used to simplify the marking of a heel cut, measuring two relative distances at right angles or marking a complimentary angle of an existing mark. Other uses will become obvious to one skilled in the art of construction.

A level(s) 35 may be contained in base 12 or guide 13 as shown and, although not shown an additional level(s) may be placed on other angles. This level(s) may be used for the plumbing of walls, determining the pitch of an existing roof and other conventional uses.

Figure 3:
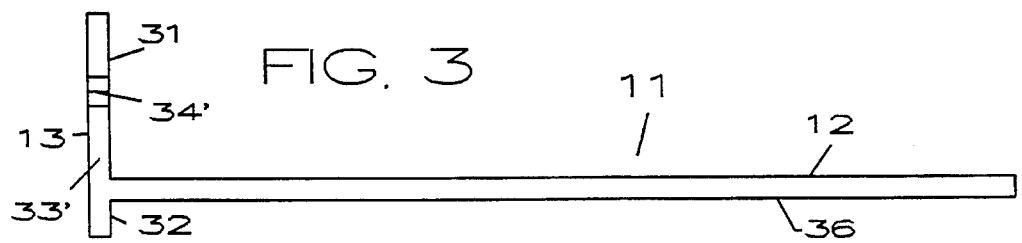
FIG. 3 is a side view of the square of FIG. 1

Referencing FIG. 3, two portions of guide 13 one a downwardly extending lip portion 32 and the other an upwardly extending portion 31 are perpendicular to base 12. These portions lengths are equal to or greater than the minimum distance required to support and maintain the guide 13 with a flush fit against a board (5/16 inch).

As an improvement portion 31 of guide 13 extends upwardly a sufficient distance not to exceed the thickness of a board (1 and ½ inches). Portion 31 should be of adequate thickness ( ⅛ to ¼ inch) to firmly hold a conventional tape measure 40 using a tapes belt-clip 41 (ref. FIG. 4). Portion 31 contains notches 34 and 34' that are located at one half the thickness of a board (¾ inch) from base 12 (ref. FIG. 1). This will allow the marking of a center line on the thickness of a board (as shown in FIG. 7B). It is noted that portion 31 could be slotted at it's upper extent to aid in securing tape 40; but is felt that this would limit the flexibility to adjust tape 40 along guide 13 and eliminate the flexibility in selecting any of the multiple, centering notches 18, 8', 18", longitudinal edges 14A, and 20 through 23, measuring locations on base 12.

Base 12 has the indicia mirrored on an opposing side 36. This provides for left or right handed use of this square.

FIG. 4 shows how square 11 may be used in marking plates using standard wood components with tape 40 snugly attached to guide 13 upper portion 31 using clip 41. A retractable tape 42 is connected to one end of a board 60. Base 12 is positioned on board 60 with lip 32 flush against a board thickness 61. The user then slides square 11 along board 60 a prescribed distance to align tape 42 indicia with centering notch(s) 8, 18', 18"(ref. FIG. 2) or edge 14A. The user then accurately marks a board side(s) 62 with a line(s) 43 (up to four parallel) at base 12 using any or all edges 20, 21, 22, and 23 in a single setting. Using these edges and centering marks enables the user to place from one to three studs on center settings without subtracting ¾ inch from every distance measured. Multiple markings are needed for window framing and the like. Rotating the square 180 degrees on side 62 will enable the user to mark from the opposite end of board 60. These advantages greatly reduce the time to perform the same functions using the various conventional tools. Additionally two or more board edges 61 may be marked simultaneously. This is accomplished by setting the boards to be marked on edge 61 and adding an additional board as a spacer on which base 12 is positioned. Then edge(s) 6 are marked basically as explained above.

FIG. 5A shows how square 11 may be used in marking plates using standard metal component member(s) with tape 40 snugly attached to guide 13 upper portion 31 using clip 41. A retractable tape 42 is connected to one end of a member 50. Base 12 is positioned on member 50 with lip 32 flush against a member thickness 51. The user then slides square 11 along member 50 a prescribed distance to align tape 42 indicia with centering notches 18, 8', 8" or edge 14A (ref. FIG. 2). The user then accurately marks a member side(s) 52 with a line(s) 53 (up to four parallel) at base 12 using any or all edges 20, 21, 22, and 23, in a single setting; this allows the user to place multiple adjacent studs on center settings, for window framing and the like. Rotating the square 180 degrees on side 52 will enable the user to mark from the other end of member 50. These advantages greatly reduce the time to perform the same functions using the various conventional tools. Additionally two or more member thickness' 51 may be marked simultaneously. This is accomplished by setting the members to be marked on member thickness 51 and adding an additional member as a spacer on which base 12 is positioned. Then thickness('s) 51 are marked basically as explained above.

FIG. 5B shows how square 11 may be used to consecutively mark the adjacent thickness 51 and side 52 of metal material. Upper portion 31 of guide 13 is placed flush against thickness 51 and base 12 positioned on side 52 of member 50. Two consecutive lines 53' and 53 are then marked on thickness 51 and side 52 at an edge 33' and edge 23 respectively. Rotating the square 180 degrees around member 50 will enable the user to mark all four sides of member 50 in two settings.

FIG. 6A to 6G is an example of the steps required to find a reference measuring point P and a final top cut mark 68 for a hip or valley top cut when using a conventional triangular shaped-square. Using the triangular shaped-square with its guide set on thickness 61 the triangular shaped-square is pivoted to read a hip/valley rise of 10 and a line 63 is marked on side 62 as in FIG. 6A. Next the triangular shaped-square is flipped and rotated to align a notch 69 with line 63. Then a line 64 is drawn perpendicular to line 63 as shown in FIG. 6B. Now the triangular shaped-square is rotated and a point 65P equal to the thickness of a board is measured and marked on side 62 as shown in FIG. 6C. The triangular shaped-square is again flipped and rotated and the guide is placed on thickness 61 and adjusted to find a hip/valley rise of 10 coincident with point 65P. Then a line 65 is marked over point 65P as in FIG. 6D. At this time the triangular shaped-square is flipped and with its guide flush against side 62 lines 63' and 65' are drawn across board thickness 61 which lines are perpendicular to line 63 and 65 respectively as shown in FIG. 6E. Next rotation of the triangular shaped-square is required to draw a diagonal joining opposite ends of lines 63' and 65' (ref. FIG. 6E) to form a diagonal line 66 on board thickness 61 as shown in FIG. 6F. Now two additional lines are required referring to FIG. 6G, a line 67 is determined by manipulating the triangular shaped-square and marking on the center of thickness 61 on lines 63' and 65'. Line 67 is drawn connecting these two points. Where line 67 bisects diagonal line 66 is a reference measuring point P. A final cut line 68 is determined and marked by measuring one half the length of diagonal 66 and performing the steps shown in FIG. 6C and 6D relative to line 63 using the length just obtained.

This process holds true for hip and valley rafter cuts and the like. It is clearly seen that many rotations of this triangular shaped-square are required to accomplish most standard rafter measurements in roof construction. Also, any error in marking results in cutting the wrong location.

FIG. 7A and 7C illustrate the steps required to find a reference measuring point P' and a final top cut mark 78 for a hip or valley top cut using square 11. Guide 13 is set on board 60 at thickness 61 as shown in FIG. 7A and square 11 is pivoted to read a hip/valley rise of 10. Then a reference measuring point line 73 and a final cut line 78 are drawn at edges 14A and 15A respectively on board side 62. Where the line segment 73 intersects thickness 61 and side 62 of board 60 is a reference measuring point P' as shown in FIG. 7C.

Edge 15A is located a distance of 0.707 times the board thickness (1.06 inches) from edge 20. This allows the user to instantly add or subtract one half the thickness of a board, cut at a 45 degree angle, for any hip or valley rafter angle. Also, it enables the user to mark a final cut line at an extreme end of a board without having to do mathematical calculations.

When marking hip or valley rafters, edge 14A is used to locate reference point P'. Edge 14A also provides the user the flexibility to add or subtract one half a board thickness when marking common rafters. Edge 14A will automatically locate the proper distance for marking a miter cut line at a standard 45 degree miter. This can be accomplished for any given pitch without making calculations and therefore saves time and reduces errors.

Additionally it is obvious that edge 15A which is located 0.207 times a board thickness from edge 14A could be located substantially the same distance from edge 20 or any edge parallel to edge 20.

FIG. 7B and 7C shows when using square 11 how the following two lines may be drawn. A line 77 may be drawn to bisect the board thickness 61 by placing a marker 79 in notch 34 on edge 33 then sliding guide 30 along board thickness 61. A line 73' is drawn perpendicular to line 73 also using edge 33.

It is clear that the layout and rafter angle measurement square of the present invention greatly reduces the steps required to make rafter cuts. It only requires one setting to locate and mark the reference measuring point and final cut line on a board. This reduces the likelihood of errors in making the required mechanical calculations and there is little possibility of mistaking which is the hip or valley final cut line.

Figure 8A:
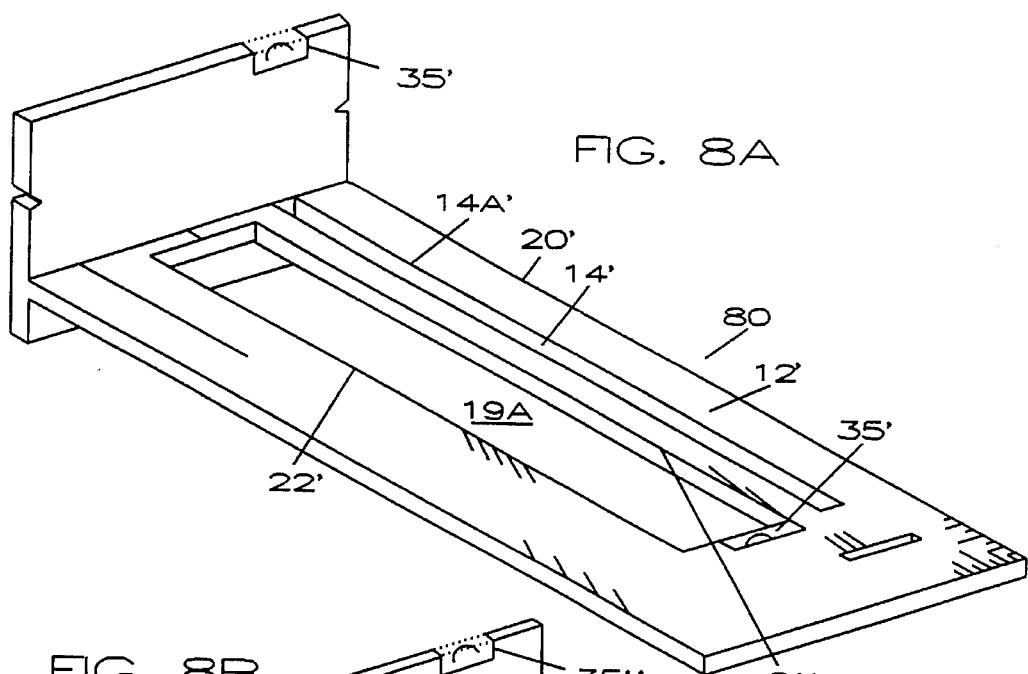
FIGS. 8A–8C illustrate additional embodiments made according to the invention.

FIG. 8A illustrates another preferred embodiment of the present invention. In this embodiment square 11 shown as a square 80 is very similar to previously described square 11, with the following alterations noted. Cutout 16 (ref. FIG. 2) in square 11 is replaced by an elongated rectangular shaped cutout 19A. Cutout 19A is placed so that edges 21' and 22' of base 12' have the same dimensioning as edges 21 and 22 of base 12. Cutout 15 and edge 15A of square 11 is a cutout 15' and an edges 15A' in square 80. Edges 15A' and 14A' have the same relationships to edge 20' of square 80 as edges 15A and 14A have to edge 20 of square 11. A level(s) 35' may be positioned as shown.

Square 11 and square 80 each have distinct advantages. Square 11 with its additional edges provides locations for additional indicia. Square 80 can mark an entire side of a board at edge 14A'. This may be used to add or subtract one half a board thickness and automatically locate the proper distance to mark a miter cut line for a standard 45 degree miter. Additionally cutout 19A provides an ergonomic means of griping square 80. Therefore, the preferred embodiment of square 11 or square 80 may be produced.

Figure 8B:
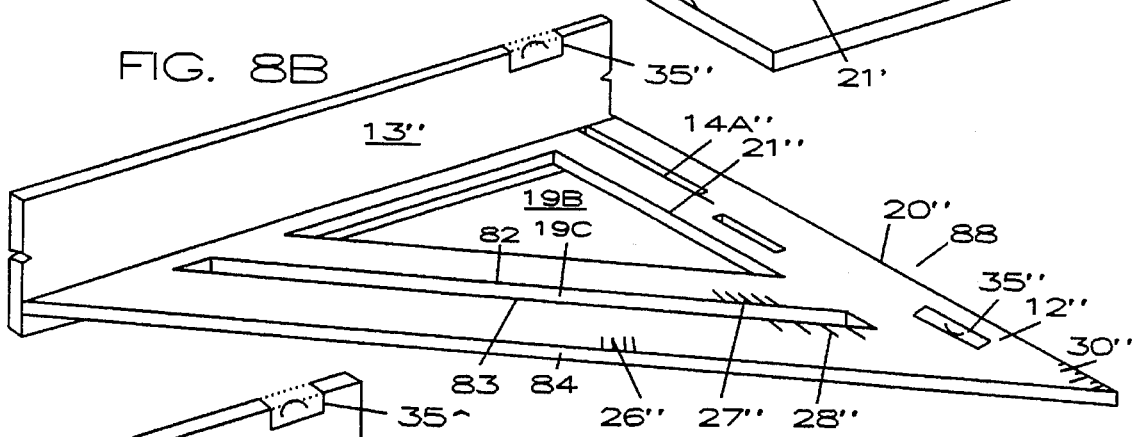

FIG. 8B illustrates a triangular shaped-square 88 made to the invention. Square 88 retains some general characteristics of square 11 for the following like numbers; a guide 13", edges 14A", 15A", 20", 21" and indicia 26", 27", and 28" (ref. FIG. 2) and therefore only the major differences are discussed. This square 88 is a right-triangular member with forty-five degree opposing angles forming a hypotenuse edge 84. One edge 20" of the right angle is elongated longitudinally and the other edge of the right angle is used as guide 13". Indicia 30" is only on edge 20" of base 12" and a level(s) 35" is placed as shown.

A triangular cutout 19B is placed on the interior of base 12" with edge 21" forming one of its edges. This cutout may be any shape and in a different embodiment it may be eliminated.

An additional cutout 19C is parallel to hypotenuse 84 of base 12" and extends sufficiently in length and width for the viewing and marking at an edge 82 or an edge 83.

Figure 8C:
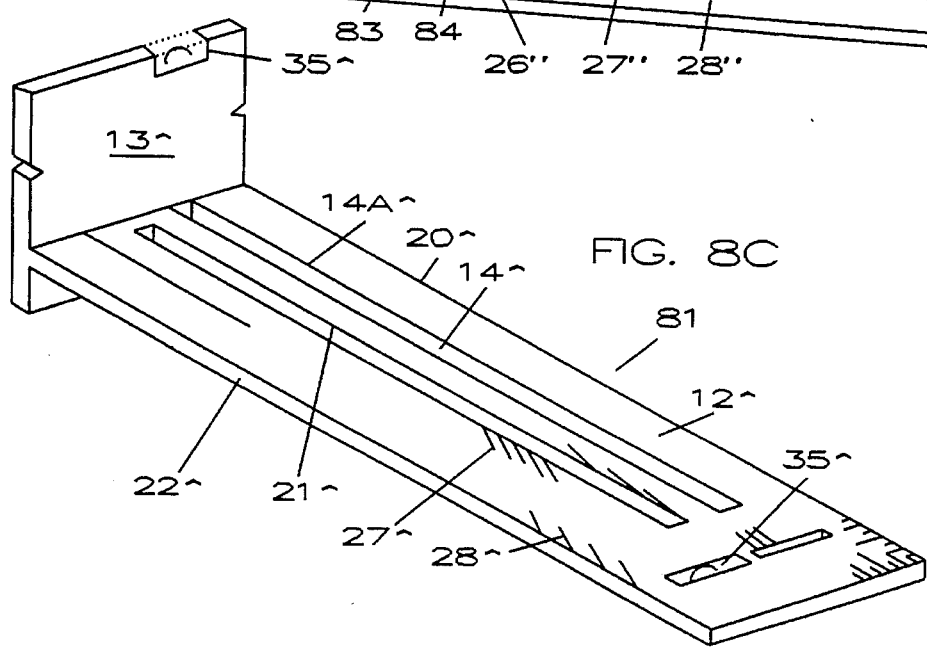

FIG. 8C illustrates another embodiment made to the present invention. In this embodiment square 11 shown as a square 81 is similar to previously described square 11, with the following alterations. Edge 23 of square 11 has been deleted on square 81. Square 81 and guide 13^ are dimensioned two board thickness' wide (3 inches). Edges 20^, 21^ and 22^ of base 12^ have the same dimensioning as edges 20, 21 and 22 of base 12. Cutout 15 and edge 15A of square 11 is a cutout 15^ and an edge 15A^ in square 81. Edges 15A^ and 14A^ have the same relationships to edge 20^ of square 81 as edges 15A and 14A have to edge 20 of square 11. Indicia 27^ and 28^ are moved to new edges on square 81. A level(s) 35^ may be positioned as shown.

Square 81 is basically functional but the user is required to add or subtract ¾ of an inch when doing plate layout for studs and the like. This is because the tape housing of a twenty five foot or larger conventional tape measure is at least 3 inches long. This is the same width as square 8. This embodiment will provide for the marking of two consecutive studs in one setting.

These embodiments of the current invention may be made of any material which may be easily molded, shaped, formed or stamped.

An advantage of this invention is to provide a method of attaching a conventional tape measure to the square as an accessory. This allows a framer to simultaneously measure and precisely mark a stud(s) on center. Therefore, reducing the steps and time required to perform the same task using separate tools.

Another advantage of the invention is a square that enables a framer to easily locate the accurate sites for correctly installing studs along top and bottom plates and the like, by identifying and marking on both plates with multiple parallel lines for one or more studs. This reduces the commonly made errors of placing the studs on the wrong side of the marks.

Another advantage may be the integration of a small carpenter-square at two adjoining edges that form a right angle by using linear indicia along these edges. This provides a standard ruler, facilitates the measuring and marking of distances at right angles such as a seat cut for rafters. Additional uses will become apparent to those skilled in construction.

Still another advantage is to provide indicia having direct reading scales for common rafters, and hip and valley rafters, for normally used roof configurations of rise to run ratios and to provide indicia as a means to directly determine and measure angles.

A further advantage is to substantially reduce the amount of steps required in determining the reference measuring point and proper location of a common or hip and valley final cut(s). Thereby reducing the mechanical calculations required to find these locations and thus reduce errors. Also, to provide the ability to easily add or subtract one half the material thickness when marking for these cuts.

An additional advantage is the ability to properly mark the distance for cutting an outward extending 45 degree miter in a single setting. This can be accomplished for all rafter run to rise ratios without having to calculate or look the distance up in a table, therefore reducing the chance of errors. Also, to provide the ability to add or subtract one half the material thickness for common cuts and the like.

Another advantage is to provide a square that provides left or right handed use for the marking of materials.

A further advantage of this square is to provide a square that is easy to understand, learn and operate.

An additional advantage of this square may be to achieve leveling to determine level and plumb, and to determine pitch or angles of an existing structure using a single tool.

A final advantage is the easy and economical manufacturing of this square. This is achieved through using commercially available components and materials, modified only to the extent necessary to fit the requirements of the invention.

Thus, it is apparent that there has been provided, in accordance with the invention, a square that fully satisfies the objects, aims and advantages set forth above.

While the invention has been described with references to specific embodiments, it is contemplated that various alterations, permutations and modifications to these embodiments may be made and will be apparent to those skilled in the art, that are within the principals and scope of the invention.

Besides the variations shown in the aforementioned embodiments, examples of some other variations are as follows. The relationships of edges 20, 14A, and 15A (ref. FIG. 2) are constant ratios. These edges, with their constant ratios, could be applied or duplicated in relation to any edge(s) parallel to edge 20. Also, edges 14A and 15A could be combined in a single cutout as two opposing edges. In addition cutout 14 could be widened so that the edge opposite to edge 14A is substantially the ratio of 0.207 times the material thickness from edge 20. These edges could be applicable to any square, of any desired shape, and could be adapted to such a square according to the teaching of the present invention. The linear indicia on edges 20 and 24 may be of any desired type for making measurements. Indicia for rafter back angle or seat cuts may be included on this square. Cutouts 17 and 17' may be placed as required to perform their basic functions or additional cutouts may be added.

Also, this square could be made with a magnetically impregnated material or have magnetic plugs inserted. This would hold it place on ferrous material.

Therefore, it is intended that the following claims be interpreted as including such variations and not be limited to the details disclosed herein.

What we claim is:

1. A construction framing square for use on rectangular shaped construction material having a first face with a first width and a second face with a second width, said square comprising:

a planar base having opposite, parallel faces and first and second contiguous edges disposed at a right angle, said first edge having a length corresponding to at least two times the first width and said second edge having a length at least the second width, said base further having means defining at least third and fourth edges parallel with said second edge with at least said second, third and fourth edges being spaced equally by a distance substantially equal to the first width, said base further having means defining a least a fifth edge parallel to said second edge and being spaced from at least one of said second, third and fourth edges by a distance substantially equal to 0.707 times the first width; and a planar guide mounted to and extending perpendicular to said base along said first edge and having a face extending in opposite directions from said base.

2. The square described in claim 1, wherein said first edge has a length corresponding to at least three times the first width, said base further has means defining a sixth edge parallel to said second edge and being spaced a distance substantially equal to the first width from at least one of said second and fourth edges, said at least fifth edge further defined as being spaced a distance substantially equal to 0.707 times the first width from at least one of said second, third, fourth and sixth edge.

3. The square described in claim 2, wherein said base further has means defining a seventh edge parallel to said second edge, said seventh edge being spaced apart a distance substantially equal to 0.207 times the first width from said at least fifth edge and being spaced apart from at least one of said second, third, fourth and sixth edges by a distance substantially equal to one half the first width.

4. The square described in claim 2, wherein said base further comprises at least one centerline indicia that is spaced an equal distance between at least one pair of adjacent edges of at least said second, third, fourth and sixth edges.

5. The square described in claim 2 further comprising at least one cutout defining at least a seventh edge, and indicia corresponding to at least one construction related unit of measurement adjacent to at least said seventh edge.

6. The square described in claim 1, wherein said base further has means defining a sixth edge parallel to said second edge, said sixth edge being spaced apart a distance substantially equal to 0.207 times the first width from said at least fifth edge and being spaced apart from at least one of said second, third and fourth edges by a distance substantially equal to one half the first width.

7. The square described in claim 1, wherein said base further comprises at least one centerline indicia that is spaced an equal distance between at least one pair of adjacent edges of at least said second, third and fourth edges.

8. The square described in claim 1, wherein said guide extends in a first direction from said base at least one half the first width, said square further comprising at least one notch extending through said guide at a distance of one half the first width from said base.

9. The square described in claim 1 further comprising at least one level mounted to at least one of said base and said guide.

10. The square described in claim 1 further comprising at least one cutout defining at least a sixth edge, and indicia corresponding to at least one construction related unit of measurement adjacent to at least said sixth edge.

11. A construction framing square for use on rectangular shaped construction material corresponding to predetermined dimensions having a first face with a first width and a second face with a second width, said square comprising:

a planar base having opposite, parallel faces and at least first and second parallel edges, said first and second edges being spaced apart a distance substantially equal to 0.207 times the first width, said base further comprises means defining at least a third edge parallel to said first and second edges, said third edge being spaced from at least said first edge by a distance substantially equal to one half the first width and spaced from at least said second edge by a distance substantially equal to 0.707 times the first width; and a planar guide mounted along a line on said base that is perpendicular to said first, second and third edges and extending perpendicular to said base, said guide having opposing parallel faces and extending in opposite directions from said base.

12. The square described in claim 11, wherein said base further has means defining a fourth edge parallel to said first and third edges, said fourth edge being spaced from at least said first edge by a distance substantially equal to one half the first width and being spaced from at least said third edge by a distance substantially equal to the first width so that the sum of distances between adjacent pairs of at least said first, second, third and fourth edges is substantially equal to the first width.

13. The square described in claim 11, wherein said base further comprises at least a fourth edge extending at a transverse angle relative to said third edge and said line on said base.

14. The square described in claim 13, wherein said base further comprises at least one cutout defining at least a fifth edge, and indicia corresponding to at least one construction related unit of measurement adjacent to at least said fifth edge.

15. The square described in claim 13, wherein said base further has means defining at least a fifth edge parallel to said first and third edges, said fifth edge being spaced from at least said first edge by a distance substantially equal to one half the first width and being spaced from at least said third edge by a distance substantially equal to the first width so that the sum of distances between adjacent pairs of at least said first, second, third and fifth edges is substantially equal to the first width.

16. The square described in claim 11, further comprising at least one level mounted on at least one of said base and said guide.

17. The square described in claim 11, wherein said guide extends in a first direction from said base at least one half the first width, said square further comprising at least one notch extending through said guide at a distance of one half the first width from said base.

* * * * *